United States Patent [19]
Lee

[11] 3,745,093
[45] July 10, 1973

[54] PROCESS FOR SEPARATING HEXAFLUOROACETONE FROM HYDROGEN FLUORIDE

[75] Inventor: Kung Hsing Lee, Wilmington, Del.

[73] Assignee: E. I. du Pont de Nemours & Company, Wilmington, Del.

[22] Filed: July 17, 1970

[21] Appl. No.: 55,652

[52] U.S. Cl. .................. 203/49, 203/87, 203/91, 203/75, 260/593 H
[51] Int. Cl. ................. C07c 49/16, B01d 5/00
[58] Field of Search ............... 203/49, 87, 99, 91, 203/75; 260/593 H; 23/294; 202/198, 199

[56] References Cited
UNITED STATES PATENTS

| | | | |
|---|---|---|---|
| 3,358,033 | 12/1967 | Anello et al. | 260/593 H |
| 2,790,755 | 4/1957 | Walker | 203/91 |
| 2,391,576 | 12/1945 | Katz et al. | 203/49 |
| 1,171,464 | 2/1916 | Rosanoff | 203/87 |
| 3,401,096 | 9/1968 | Wondrak | 203/87 |
| 3,397,041 | 8/1968 | Rivers | 203/87 |
| 2,432,405 | 12/1947 | Gerhold | 203/87 |
| 3,544,633 | 12/1970 | Yodis et al. | 260/593 H |
| 3,433,838 | 3/1969 | Cunningham et al. | 260/593 H |

FOREIGN PATENTS OR APPLICATIONS 1,372,549  8/1964  France ........................ 260/593 H Primary Examiner—Wilbur L. Bascomb, Jr.
Attorney—Francis J. Crowley

[57] ABSTRACT

Process for separating hexafluoroacetone from hydrogen fluoride by vaporizing a hexafluoroacetone-hydrogen fluoride addition complex and subjecting the vaporized complex to non-equilibrium condensation.

11 Claims, 3 Drawing Figures

PROCESS FOR SEPARATING HEXAFLUOROACETONE FROM HYDROGEN FLUORIDE

BACKGROUND OF THE INVENTION

1. Field of the Invention

This invention relates to a commercially practical process for separating hexafluoroacetone from hydrogen fluoride and more particularly to the separation of hexafluoroacetone from hydrogen fluoride by the vaporization of a hexafluoroacetone-hydrogen fluoride addition complex and the non-equilibrium condensation of the resultant vapor.

2. Description of the Prior Art

French Pat. No. 1,372,549 describes the reaction of hexachloroacetone with hydrogen fluoride in the presence of a chromium (III) catalyst to form hexafluoroacetone. The reaction may be represented by

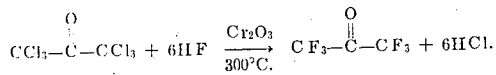

$$CCl_3-C(O)-CCl_3 + 6HF \xrightarrow[300°C.]{Cr_2O_3} CF_3-C(O)-CF_3 + 6HCl.$$

This reaction is carried out with excess hydrogen fluoride to insure complete fluorination to hexafluoroacetone and to maintain productivity. Thus the product stream contains hexafluoroacetone, hydrogen chloride and hydrogen fluoride. However, because of the strong electron withdrawing influence exerted by the two perfluoromethyl groups of the hexafluoroacetone and the resulting enhanced electropositive nature of the carbonyl carbon, the hexafluoroacetone is in fact present as an addition complex with hydrogen halide. This addition complex has been characterized in U.S. Pat. No. 3,030,509 as α-halosecondary alcohol. Its formation may be represented by

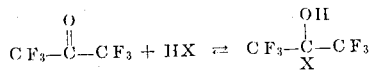

$$CF_3-C(O)-CF_3 + HX \rightleftarrows CF_3-C(OH)(X)-CF_3$$

where HX is hydrogen halide. It is recognized in the art (see for example Anello and Yodis U.S. Pat. No. 3,358,033), that the separation of hexafluoroacetone from hydrogen fluoride in the fluorination product stream mixture by the usual physical methods, e.g., stripping or distillation, is not practical.

The prior art processes employed for separating hexafluoroacetone from the hexafluoroacetone-hydrogen fluoride addition complex have involved contacting the complex with activated sodium fluoride to form a hydrogen fluoride molecular complex with sodium fluoride and distilling the acid-free hexafluoroacetone as described in French Pat. No. 1,372,549 or by contacting the complex with sulfur trioxide to form fluorosulfonic acid and then separating the liberated hexafluoroacetone by distillation as described in U.S. Pat. No. 3,358,033. These prior art processes for separating hexafluoroacetone from the hydrogen fluoride complexes are not commercially practical because they require the time consuming and costly steps of (1) separation of hexafluoroacetone-hydrogen fluoride complex from excess hydrogen fluoride by distillation, (2) contacting of the separated complex with sodium fluoride or sulfur trioxide and (3) recovering the hexafluoroacetone. Further, for an economically useful process, hydrogen fluoride must be then recovered from the sodium fluoride or fluorosulfonic acid.

It has now been discovered that hexafluoroacetone may be separated from the hydrogen fluoride of a hexafluoroacetone-hydrogen fluoride addition complex by vaporizing a hexafluoroacetone-hydrogen fluoride addition complex and subjecting the resultant vapor to non-equilibrium condensation. This novel process provides a commercially practical method for accomplishing the desired separation.

SUMMARY OF THE INVENTION

This invention is directed to a process for separating hexafluoroacetone from hydrogen fluoride which comprises vaporizing a hexafluoroacetone-hydrogen fluoride addition complex and subjecting the vaporized complex to non-equilibrium condensation. The liquid fraction thus produced is enriched in hydrogen fluoride while the remaining vapor fraction consists essentially of hexafluoroacetone. The hexafluoroacetone is then recovered by any art-known means, e.g., by use of a condenser if the process is run in a distillation column.

DESCRIPTION OF THE INVENTION

Figure 1:
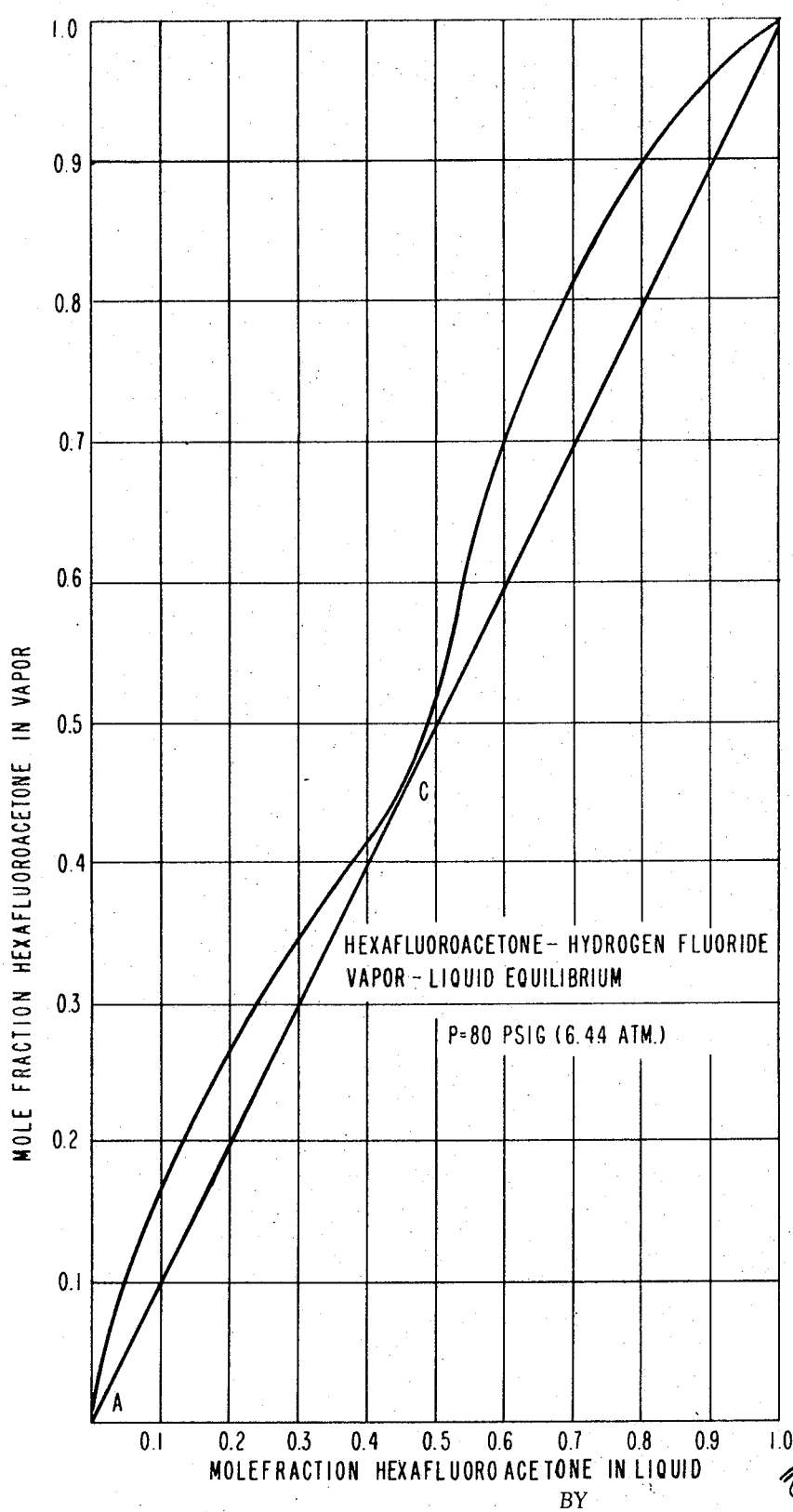
FIG. 1 is an experimentally determined vapor-liquid equilibrium composition diagram for a binary mixture of hexafluoroacetone and hydrogen fluoride at 6.44 atmospheres pressure (80 psig). The X axis representing mole fraction of hexafluoroacetone present in the liquid form of the mixture and the Y axis representing the mole fraction of hexafluoroacetone present in the vapor form of the mixture.

The present invention is a process for separating hexafluoroacetone from hydrogen fluoride which comprises vaporization of a hexafluoroacetone-hydrogen fluoride addition complex and subjecting the vaporized complex to non-equilibrium condensation to yield a liquid fraction enriched in hydrogen fluoride and a vapor fraction consisting essentially of hexafluoroacetone and recovering the hexafluoroacetone. The hexafluoroacetone-hydrogen fluoride addition complex as used herein may be defined by the structure

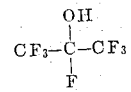

$$CF_3-C(OH)(F)-CF_3$$

wherein the hydrogen fluoride and hexafluoroacetone are present in a theoretical mole ratio of 1:1, i.e.,

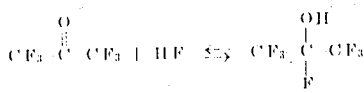

$$CF_3-C(O)-CF_3 + HF \rightleftarrows CF_3-C(OH)(F)-CF_3$$

The process may be utilized to separate the hexafluoroacetone and hydrogen fluoride present in any such hexafluoroacetone-hydrogen fluoride addition complex regardless of the method of preparation of the complex. It is particularly useful in conjunction with the process of manufacturing hexafluoroacetone by the fluorination of hexahaloacetone, e.g., hexachloroacetone, with hydrogen fluoride wherein the resulting product mixture consists of hexafluoroacetone, hydrogen chloride and hydrogen fluoride since an excess of hydrogen fluoride is used to insure complete fluorination of the hexahaloacetone. The recovery of hexafluoroacetone from this product mixture is, however, not readily accomplished by distillation because while the product mixture ostensibly consists of hexafluoroacetone, hydrogen chloride and hydrogen fluoride only, there occurs in fact during the reaction the formation of an addition complex between the hexafluoroacetone and hydrogen fluoride. The strong electron withdrawing influence of the two perfluoromethyl groups in hexafluoroacetone results in a strong electropositive effect on the carbonyl carbon which makes the complex between hexafluoroacetone and hydrogen fluoride quite stable. This complex of hexafluoroacetone and hydrogen fluoride is variously referred to as a complex, an addition compound or as a chemical compound. Regardless of the nomenclature, it is generally agreed that the following equilibrium exists

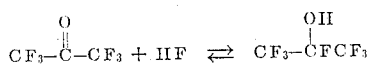

with the α-fluorosecondary alcohol constituting the complex. This equilibrium is dependent upon temperature and at 20° C. the dissociation is about 35 percent while at 100° C. the dissociation is about 75 percent.

It is possible to obtain partial separation of the above-mentioned product mix of hexafluoroacetone-hydrogen fluoride complex, hydrogen chloride and hydrogen fluoride. Hydrogen chloride can usually be removed by simple distillation, and the hexafluoroacetone-hydrogen fluoride (b.p. 14°–16° C.) may be separated from the excess hydrogen fluoride (b.p. 19.4° C.) by fractional distillation. The hexafluoroacetone-hydrogen fluoride complex, however, cannot be separated into its components of hexafluoroacetone and hydrogen fluoride by distillation procedures which depend upon maintaining vapor-liquid equilibrium for separation since the vapor in equilibrium with the liquid has the same composition as the liquid.

The accompanying FIG. 1 is an experimentally determined vapor-liquid equilibrium composition diagram for a binary mixture of hexafluoroacetone and hydrogen fluoride at 6.44 atmospheres (80 psig). It will be noted that there appears in the Figure a "pinch point" (point C) where the mole fraction of hexafluoroacetone is approximately 0.45 (experimentally determined). Referring to this Figure, it can be seen that a mixture having the "pinch point" composition, i.e., 50 mole percent (12.85 wt. percent) hydrogen fluoride cannot be separated by distillation to give pure hexafluoroacetone since the vapor composition is identical to the liquid composition. It is also evident that a distillation of hexafluoroacetone-hydrogen fluoride mixture richer in hydrogen fluoride than about 55 mole percent, i.e., any point falling between "pinch point" C and pure hydrogen fluoride point A in the Figure, will result in separation into a hexafluoroacetone-hydrogen fluoride complex having essentially a 1:1 ratio "pinch point" composition and essentially pure hydrogen fluoride. It is likewise evident that a distillation of a mixture richer in hexafluoroacetone than 45 mole percent, i.e., any point on the Figure following between "pinch point" C and pure hexafluoroacetone point B will result in separation into a hexafluoroacetone-hydrogen fluoride complex having essentially a 1:1 ratio "pinch point" composition and essentially pure hexafluoroacetone.

The difficulty which arises is that utilizing art-known methods of separation and beginning at a point on the Figure falling anywhere between pure hydrogen fluoride point A and "pinch point" C it would be impossible to obtain the pure or essentially pure hexafluoroacetone composition of point B. The reason for this is that in utilizing art-known methods of distillation at "pinch point" C the vapor composition is identical to the liquid composition and thus condensation of any vapor at that point will result in a liquid no richer in hexafluoroacetone than the "pinch point" itself, thus making it impossible to obtain therefrom any composition which would appear on the Figure between "pinch point" C and point B.

Figure 2:
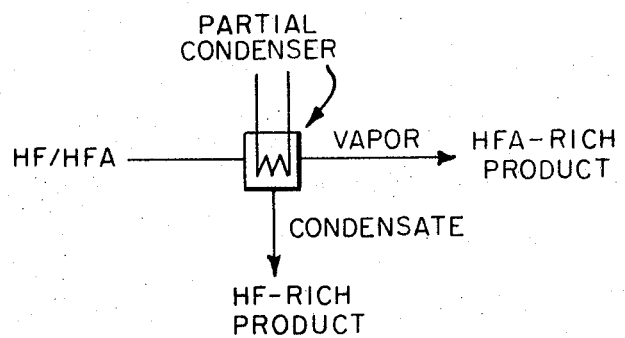
Figure 3:
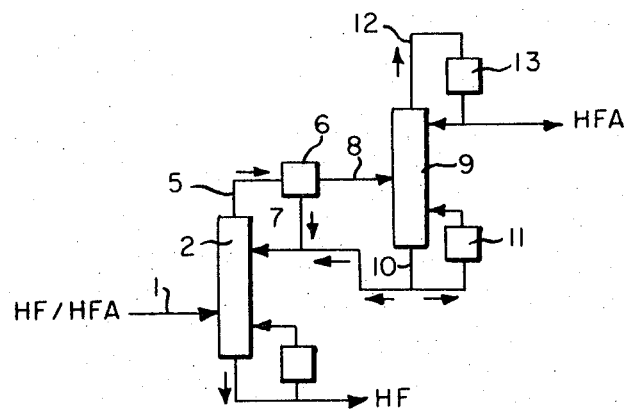

FIG. 2 shows the essential embodiments of the present invention while FIG. 3 shows an industrial application of a continuous process comprising a specific embodiment of the present invention for the separation of HFA from a mixture of HFA and HF.

In FIG. 2 a feed vapor comprising HF/HFA is passed through a partial condenser. A composition richer in HF than is the feed vapor is condensed in the partial condenser and removed from the stream as a condensate. The uncondensed vapor, which is richer in HFA than is the feed vapor, passes through the partial condenser and is recovered by any art-known means.

In FIG. 3 a feed stream comprising HF/HFA is charged to continuous fractionating column 2. Stream 3 leaving the bottom of column 2 contains essentially pure HF. A part of stream 3 is removed from the process as shown and the rest is recycled to column 2 after vaporization in reboiler 4. The overhead steam 5 leaving column 2 comprises HF/HFA corresponding more or less to the "pinch point" composition. The stream 5 enters, in the vapor phase, partial condenser 6 wherein the process of the invention occurs, i.e., a condensate enriched in HF is formed and returned to column 2 as reflux liquid. The uncondensed vapor, enriched in HFA above the amount present in the HF/HFA complex, i.e., a composition above the "pinch point" is fed, in stream 8, to continuous fractionating column 9. Material leaving the bottom of column 9 in stream 10 is divided. A part is charged to reboiler 11 where it is vaporized and returned to column 9. The rest joins stream 7 and is returned with that stream to column 2. The overhead vapor stream 12 from column 9 is totally condensed in condenser 13. The condensate stream from condenser 13, consisting of essentially pure HFA, is divided. A part of the condensate stream is returned to column 9 as reflux liquid and the rest is removed from the process as pure product.

As will occur to one skilled in the art, columns 2 and 9 can be combined, one above the other, providing a partial condenser and means for removing the HF-rich stream is provided between them.

Primarily because of above-mentioned difficulty in separating hexafluoroacetone from hydrogen fluoride, the prior art methods of separation have involved preliminary distillation to separate hexafluoroacetone-hydrogen fluoride complex from hydrogen chloride and excess hydrogen fluoride (i.e., over that utilized in the formation of the complex) and then contacting the hexafluoroacetone-hydrogen fluoride complex with either activated sodium fluoride or sulfur trioxide to liberate hexafluoroacetone. Water is of little use for removing hydrogen fluoride from the complex since hexafluoroacetone forms stable hydrates.

By utilizing the process of the present invention it is possible to separate hexafluoroacetone from hydrogen fluoride by the vaporization of the hexafluoroacetone-hydrogen fluoride complex followed by non-equilibrium condensation of the vaporized complex.

By non-equilibrium condensation is meant partial condensation of vapors such that the vapor and the liquid are not in equilibrium. This non-equilibrium condensation is to be contrasted to equilibrium condensation present in usual fractional distillation wherein the vapor and the liquid are in equilibrium. In the process of this invention non-equilibrium condensation may be accomplished in any of several ways, e.g., (1) by adjusting the temperature of the condensation surface and the temperature of the vaporized complex such that only a portion of the vapors are condensed, (2) by carrying out the condensation in the presence of vaporized inert diluent such that only a portion of the condensation surface is available for condensation or (3) by vaporization of the complex above the critical temperature of hexafluoroacetone (84° C.) (usually under pressure) such that hydrogen fluoride and undissociated complex are condensed while hexafluoroacetone being at a temperature above its critical temperature is not condensed. The above non-equilibrium condensation may take place at the condenser surface or in the environment of a fractionation column such as is commonly used in fractional distillation.

The vaporized hexafluoroacetone-hydrogen fluoride complex is partially dissociated into hexafluoroacetone and hydrogen fluoride, the extent of dissociation depending upon the temperature under the conditions of partial condensation. Hydrogen fluoride is more readily condensed because of the difference in the vapor pressure between hydrogen fluoride and hexafluoroacetone. The departure from the vapor-liquid equilibrium is further enhanced when the separation is carried out at a temperature above the critical temperature of hexafluoroacetone whereby only hydrogen fluoride and undissociated hexafluoroacetone-hydrogen fluoride complex are condensable.

The separation of hexafluoroacetone from hydrogen fluoride may be carried out under a variety of conditions provided that non-equilibrium condensation conditions are maintained. Operation at atmospheric pressure may be carried out by vaporizing the hexafluoroacetone-hydrogen fluoride complex, heating the vaporized mixture to insure the maintenance of the hexafluoroacetone as a vapor, and subjecting the heated vapor to partial condensation by contacting the heated vapor with cooled condensation surface such that only a portion of the vapor is condensed. The condensed liquid will be enriched in hydrogen fluoride and may be recirculated to remove additional hexafluoroacetone. The uncondensed vapor will be enriched in hexafluoroacetone and can be conducted away from the initial condensation area to be recovered. By controlling the amount of heated vapor condensed, it is possible to obtain a hexafluoroacetone-hydrogen fluoride mixture which is richer in hexafluoroacetone than the "pinch point" composition, and from this hexafluoroacetone enriched mixture, pure hexafluoroacetone is readily obtained, e.g., by continuing the process of this invention or by simple distillation. The temperature to which the vaporized hexafluoroacetone-hydrogen fluoride complex may be heated will be from about 35° C. to about 200° C. Temperatures much below 35° C. are not very useful since the amount of dissociation of the complex is small whereas temperatures much above 200° C. may lead to excessive thermal decomposition of hexafluoroacetone.

Separation may be carried out at atmospheric pressure as illustrated in Example 1. The process of present invention may, however, also be carried out at superatmospheric pressure. The advantage of operation at superatmospheric pressure is that the vaporization temperature of hexafluoroacetone-hydrogen fluoride complex is increased and the additional step of heating the vaporized complex is not required. The higher temperature obtainable with higher pressure favors greater dissociation of the complex into hexafluoroacetone and hydrogen fluoride and thus assures the maintenance of greater non-equilibrium condensation conditions. An additional advantage of operation at superatmospheric pressure is that it is possible to vaporize and maintain the vaporized complex at a temperature above the critical temperature of hexafluoroacetone such that non-equilibrium condensation conditions are further enhanced.

Critical temperature of hexafluoroacetone is given as 84.1° C. in Product Data Sheet No. PD-56-FK-663 by Allied Chemicals and as 78° C. in Technical Report DP-1 "Freon" Products Division, Du Pont.

As indicated above, the non-equilibrium condensation of vaporized complex is advantageously carried out in the environment of fractionation column. The operation may be carried out at a pressure of from about 1 atmosphere to about 30 atmospheres. Pressures above 30 atmospheres may be used but the difficulties attending commercial separation unit at such pressures together with the fact that the critical pressure of hexafluoroacetone is approximately 30 atmospheres would make an operation at a pressure over 30 atmospheres undesirable. The preferred pressure is in the range of about 10 atmospheres to about 16 atmospheres. The most preferred pressure is in the range of about 12 atmospheres to about 15 atmospheres.

As is well known in the art, non-equilibrium condensation conditions may also be enhanced by the presence in the system of non-condensable inert diluent vapor. Thus, operation at atmospheric or superatmospheric pressure may be advantageously carried out by continuously adding a small amount of inert gas such as nitrogen, or the like.

The separation of hexafluoroacetone from hydrogen fluoride according to this invention preferably accomplished in conventional fractional distillation equipment by vaporization and non-equilibrium condensation of a hexafluoroacetone-hydrogen fluoride mixture within a pressure range of from about 10 to about 30 atmospheres wherein said vaporization is accomplished within a temperature range of from about 65° C. to about 120° C.

More preferably, the separation of hexafluoroacetone from hydrogen fluoride is accomplished in conventional fractional distillation equipment by vaporization and non-equilibrium condensation of a hexafluoroacetone-hydrogen fluoride mixture within a pressure range of from about 12 atmospheres to about 15 atmospheres wherein said vaporization is accomplished within a temperature range of from about 80° C. to about 90° C.

The hexafluoroacetone obtained by the process of the present invention is useful as a polymerizable fluorine containing monomer and also as an intermediate, e.g., it may be used in the preparation of trifluoroacetic acid which in turn is useful as an esterification catalyst as a solvent for cellulose. It may be used to form hydrates of hexafluoroacetone which are known to be useful as solvents for difficulty soluble polymers such as polyesters, polyamides, and polyacetals and the like as for example in U.S. Pat. No. 3,234,162.

EXAMPLES

The following examples are intended to be merely illustrative of the invention and not in limitation thereof. Unless otherwise indicated, all quantities are by weight.

EXAMPLE 1

A reactor was constructed wherein all parts which would come in contact with hexafluoroacetone and hydrogen fluoride were made of stainless steel. The condenser was a 90 cm. (3 feet) long coiled 0.63 cm. (¼-inch) stainless steel tubing having an effective cooling surface of 185 square cm. (0.2 sq. ft.). A mixture of hexafluoroacetone and hydrogen fluoride was heated in a still pot to vaporize the mixture, the vapor was conducted through a tubing which was heated my means of a heating tape. This superheated vapor was then allowed to contact the condenser surface. The temperature of the condenser surface was controlled by the rate of flow and the temperature of the coolant fluid which was externally cooled in a dry ice-acetone bath. A receiver (receiver A) immersed in a dry ice-acetone bath was placed directly below the condenser such that any condensed liquid would be collected in said receiver. An outlet was placed opposite the point of entrance of the heated hexafluoroacetone-hydrogen fluoride vapor such that any uncondensed vapor would be conducted away and collected in a refrigerated receiver (receiver B). Thus it was possible to utilize heated hexafluoroacetone-hydrogen fluoride vapor at any desired temperature, by adjusting the flow and the temperature of the coolant fluid accordingly to control the temperature of the condenser surface and thereby control the proportion of vapor which was condensed and collected in receiver A. Sampling ports were built in the vapor line just after the heating location but just before the point at which the vapor comes in contact with the condenser. Such ports were also built into the vapor line conducting uncondensed vapor from the condenser area. All compositional analyses of the end products were carried out by determining the fluoride ion content using a fluoride ion specific electrode. Results are summarized in Table 1 at right.

From this example it can be seen that by superheating the hexafluoroacetone-hydrogen fluoride mixture and subjecting the resultant vapor to non-equilibrium condensation, an enrichment of hexafluoroacetone in the uncondensed vapor fraction beyond that of the "pinch point" composition of the accompanying Figure is obtained. "Pinch point" composition contained 12.85 weight percent hydrogen fluoride.

EXAMPLE 2

This example illustrates the separation of hexafluoroacetone from hexafluoroacetone-hydrogen fluoride by non-equilibrium condensation at pressures greater than atmospheric. The analytical distillation unit was a 5.1 cm. (w inch) diameter sieve plate column constructed of stainless steel. The column contained 17 sieve plates with a 15.3 cm. (6 inch) plate spacing. Each plate had 16, , 0.32 cm. (⅛-inch) diameter holes. The down pipe was of 1.25 cm. (½-inch) diameter. The reboiler had a capacity of approximately 5 liters (1.5 gallons) and was heated by strip heaters attached to the wall. The column was equipped with a dephlegmator with a cooling surface of about 1,850 sq. cm. (2sq. ft.). The coolant used was refrigerated brine. In some of the experiments, nitrogen was put into the column to blanket the condenser and to obtain desired pressure at set heat load and coolant temperature. In operation the reboiler was charged with hexafluoroacetone-hydrogen fluoride mixture, the column was operated under total reflux at desired temperature, pressure and column pressure differential. Samples were taken from (1) reboiler, (2) vapor space just below the dephlegmator and (3) within the column (usually the seventh plate). The results are summarized in Table 2 below.

TABLE 2.—HEXAFLUOROACETONE SEPARATION

|  | Run number | | | |
|---|---|---|---|---|
|  | Run A | Run B | Run C | Run D |
| Total column pressure (atm.) | 6.5 | 6.1 | 6.5 | 18.0 |
| Nitrogen added | | | (¹) | (¹) |
| Temperature, °C.: | | | | |
| Condenser, brine | 2.2 | 5.3 | 2.0 | 2.2 |
| Top | 28.0 | 22.9 | 42.2 | 58 |
| 15th plate | 66.4 | 23.2 | 64.8 | 94 |
| 7th plate | 66.7 | 35.0 | 65.6 | 99.5 |
| 2d plate | | | | 103 |
| Reboiler | 68.8 | 69 | 67.2 | 137 |
| Reflux | Total | Total | Total | Total |

| Composition, percent HF: | Wt. | Mole | Wt. | Mole | Wt. | Mole | Wt. | Mole |
|---|---|---|---|---|---|---|---|---|
| HFA/HF charged | 16.4 | 62 | 8.1 | 42.2 | 16.4 | 62 | 16.4 | 6.2 |
| Top (vapor) | 6.8 | 37.8 | 0.02 | 0.44 | 4.4 | 2.75 | 6.2 | 35.5 |
| 7th plate (liquid) | 15.4 | 60.2 | 0.72 | 4.7 | 14.8 | 59.1 | 15.4 | 60.3 |
| Reboiler (liquid) | 18.8 | 65.8 | 11.5 | 51.4 | 16.4 | 62.0 | 71.9 | 95.5 |

¹ Yes.

These runs clearly show that starting with hexafluoroacetone-hydrogen fluoride of higher hydrogen fluoride content than the "pinch point" composition (12.85 weight percent HF), a vapor fraction which is richer in hexafluoroacetone than the "pinch point" composition is obtained. Run B illustrates that once a hexafluoroacetone-hydrogen fluoride composition richer in hexafluoroacetone than the "pinch point" composition is obtained, essentially pure hexafluoroacetone is readily obtained.

EXAMPLE 3

Separation of hexafluoroacetone from hexafluoroacetone-hydrogen fluoride was demonstrated in a commercial scale separation unit. The unit comprised an 11.4 liter (3 gallon) capacity still pot, heated by means of steam, with four 4.32 meter (12 ft.) sections of 7.6 cm. (3 inch) column packed with Raschig rings. One thermocouple lead was placed in the still pot and 16 other leads were placed along the column, the uppermost thermocouple lead being placed just beneath the condenser. The condenser consisted of two sections. The lower section being a double pipe with 185 sq. cm. (0.2 sq. ft.) surface and the upper section, placed immediately above the lower one, comprised a shell and tube type of 1,675 sq. cm. (1.8 sq. ft.) surface.

Two series of runs were carried out utilizing the equipment. In one series the equipment was operated under total reflux such that conditions of temperature and pressure could be determined. In the second series continuous separation of hexafluoroacetone was carried out by continuous addition of crude hexafluoroacetone-hydrogen fluoride charge. Table 3 following summarizes the results under total reflux conditions while Table 4 summarizes the results with continuous separation of hexafluoroacetone.

TABLE 3.—HEXAFLUOROACETONE SEPARATION IN LARGE UNIT—TOTAL REFLUX

| Pressure, atmospheres | 14.3 | 14.2 | 13.7 | 13.3 |
|---|---|---|---|---|
| Temperatures, °C.: | | | | |
| Still pot | 108 | 102 | 98 | 114 |
| Middle of 1st column section | 97 | 92 | 95 | 109 |
| Middle of 2d column section | | 91.5 | 69 | 92 |
| Middle of 3d column section | | 91.5 | 50 | 90 |
| Middle of 4th column section | | 52 | 50 | 77 |
| Below condenser | 93 | 50.5 | 50 | 52 |
| Composition, wt. percent HF: | | | | |
| Feed | 30 | 30 | 30 | 30 |
| Above condenser | | 0.01 | 0.007 | 0.67 |
| Below condenser | 0.01 | 0.08 | 0.006 | 0.12 |
| Still pot | | 61.5 | 64.9 | 97.5 |

TABLE 4.—HEXAFLUOROACETONE SEPARATION—CONTINUOUS

| Pressure, atmospheres | 13.1 | 13.0 | 13.7 | 11.4 |
|---|---|---|---|---|
| Temperatures, °C.: | | | | |
| Still pot | 104 | 97 | 99 | 92 |
| Middle of 1st column section | 91.5 | 90 | 93 | 87 |
| Middle of 2d column section | 91.0 | 90 | 93 | 87 |
| Middle of 3d column section | 91.0 | 90 | 92 | 86 |
| Middle of 4th column section | 51 | 51 | 50 | 75 |
| Below condenser | 49 | 42 | 32 | 55 |
| Reflux ratio | 49 | 42 | 32 | 55 |
| Lbs./hr.: | | | | |
| Feed | 5 | 10 | 10 | 10 |
| Distillate | 2.9 | 3.8 | 3.9 | 3.4 |
| From still pot | 2.1 | 6.2 | 6.1 | 6.6 |
| Composition, wt. percent HF: | | | | |
| Feed | 28.8 | 33.4 | 33.0 | 32.5 |
| Above condenser | 0.11 | 0.01 | 0.055 | 0.44 |
| Below condenser | 0.01 | 0.01 | | |
| Still pot | 71.3 | 53.7 | 51.4 | 48.8 |

The test runs of this example show the advantages of carrying out the separation of hexafluoroacetone from a mixture of hexafluoroacetone-hydrogen fluoride under pressure. Note that the tables 3 and 4 show that approximately three-fourths of the column is at a temperature above the critical temperature of hexafluoroacetone thus enhancing non-equilibrium conditions.

The process of present invention thus provides an economical and efficient process for the separation of hexafluoroacetone from the product mix containing hydrogen fluoride. The process of present invention may be practiced in several ways. In one process the crude product mix from fluorination of hexahaloacetone may be subjected to preliminary distillation to separate the hexafluoroacetone-hydrogen fluoride from excess hydrogen fluoride and from hydrogen chloride. The hexafluoroacetone-hydrogen fluoride complex may then be broken by non-equilibrium condensation process to yield purified hexafluoroacetone as described above. In another aspect of this process, crude product mix from the fluorination reaction, without preliminary distillation to remove hydrogen chloride, may be treated by the process of this invention to yield purified hexafluoroacetone as in Example 3 where the feed material for the separation had a hydrogen fluoride content of from 28.8 to 33 percent by weight of hydrogen fluoride.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A process for recovering a hexafluoroacetone enriched product containing less than about 12.85 weight percent hydrogen fluoride from a hexafluoroacetone-hydrogen fluoride addition complex containing at least about 12.85 weight percent hydrogen fluoride, comprising vaporizing the hexafluoroacetone-hydrogen fluoride addition complex to obtain a complex containing about 12.85 weight percent hydrogen fluoride, selectively condensing the resulting vapor in a condensing area, thereby producing a hydrogen fluoride enriched liquid condensate containing more than about 12.85 weight percent hydrogen fluoride and a resulting vapor enriched in hexafluoroacetone containing less than about 12.85 weight percent hydrogen fluoride, removing the liquid condensate from contact with the hexafluoroacetone enriched vapor in the condensing area, and recovering the hexafluoroacetone enriched product.

2. A process according to claim 1 wherein the vaporization and condensation are carried out in the presence of a non-condensable inert diluent.

3. A process according to claim 2 wherein the diluent is nitrogen.

4. A process according to claim 1 comprising additionally heating the vaporized complex to a temperature of from about 35° C. to about 200° C.

5. A process according to claim 1 wherein the vaporization and condensation are carried out within a pressure range of from 1 atmosphere to about 30 atmospheres.

6. A process according to claim 5 wherein the vaporization and condensation are carried out within a pressure range of from about 10 atmospheres to about 16 atmospheres.

7. A process according to claim 6 wherein the vaporization and condensation are carried out within a pressure range of from about 12 atmospheres to about 15 atmospheres.

8. A process according to claim 1 wherein the vaporization is carried out at a temperature above the critical temperature of hexafluoroacetone.

9. A process according to claim 8 wherein the vaporization is carried out at greater than atmospheric pressure.

10. A process according to claim 1 wherein the vaporization and condensation are carried out within a pressure range of from about 10 atmospheres to about 30 atmospheres and wherein said vaporization is carried out at a temperature within the range of from about 65° C. to about 120° C.

11. A process according to claim 10 wherein the vaporization and condensation are carried out within a pressure range of from about 12 atmospheres to about 15 atmospheres and wherein said vaporization is carried out within a temperature range of from about 80° C. to about 90° C.

* * * * *